United States Patent
Helfenbein et al.

(10) Patent No.: US 11,937,989 B2
(45) Date of Patent: Mar. 26, 2024

(54) DENTAL PROPHYLACTIC TREATMENT DEVICE

(71) Applicant: W&H Dentalwerk Bürmoos GmbH, Bürmoos (AT)

(72) Inventors: Gerald Helfenbein, Gilgenberg (AT); Gerhard Hochradl, St. Pantaleon (AT); Gernot Ploy, Bürmoos (AT); Johann Eibl, Mattighofen (AT)

(73) Assignee: W&H Dentalwerk Bürmoos GmbH, Bürmoos (AT)

( * ) Notice: Subject to any disclaimer, the term of this patent is extended or adjusted under 35 U.S.C. 154(b) by 655 days.

(21) Appl. No.: 16/732,100

(22) Filed: Dec. 31, 2019

(65) Prior Publication Data

US 2020/0197142 A1   Jun. 25, 2020

Related U.S. Application Data

(63) Continuation of application No. PCT/EP2018/069059, filed on Jul. 13, 2018.

(30) Foreign Application Priority Data

Jul. 14, 2017 (EP) .................................. 17181328

(51) Int. Cl.
*A61C 17/00* (2006.01)
*A61C 1/14* (2006.01)

(52) U.S. Cl.
CPC ............ *A61C 17/005* (2013.01); *A61C 1/141* (2013.01); *A61C 1/144* (2013.01)

(58) Field of Classification Search
CPC ......... A61C 1/141; A61C 1/142; A61C 1/144; A61C 17/005; A61C 17/22; A61C 1/14;
(Continued)

(56) References Cited

U.S. PATENT DOCUMENTS 2,451,918 A * 10/1948 Chott ................... A61C 17/005
                                                      403/289
3,106,732 A    10/1963 Dayton et al.
(Continued)

FOREIGN PATENT DOCUMENTS

CN        104797212        7/2015
DE       102004002868      3/2005
(Continued)

OTHER PUBLICATIONS

International Search Report for PCT/EP2018/069059, dated Dec. 10, 2018.

*Primary Examiner* — Edward Moran
(74) *Attorney, Agent, or Firm* — Klarquist Sparkman, LLP

(57) ABSTRACT

A dental prophylactic treatment device having: a prophylactic contra-angle handpiece having a handle part extending along a longitudinal axis, a head part adjoining the handle part, a tool holder rotatably disposed in the head part and extending along an axis of rotation, wherein the longitudinal axis of the handle part and the axis of rotation of the head part are disposed at an angle to one another, and a dental tool having a tool shaft and a prophylactic treatment section, wherein the tool shaft extends from a handpiece end of the dental tool over a length up to the prophylactic treatment section, wherein at least a section of the tool shaft is detachably received in the tool holder, so that the dental tool together with the tool holder can be rotated about the axis of rotation, and wherein the length of the tool shaft is a maximum of 10.0 mm.

16 Claims, 3 Drawing Sheets

(58) Field of Classification Search
CPC ....... A61C 1/145; A61C 1/147; A61B 17/162; B23B 31/08; B23B 31/1078; B23B 2231/58; Y10T 279/17162; Y10T 279/17153; Y10T 279/17145
See application file for complete search history.

(56) References Cited

U.S. PATENT DOCUMENTS

| | | | | |
|---|---|---|---|---|
| 4,234,308 | A | * 11/1980 | Leonard | A61C 1/141 433/127 |
| 4,634,379 | A | * 1/1987 | Nash | A61C 3/02 433/166 |
| 4,661,062 | A | * 4/1987 | Seigneurin | B23B 31/1072 433/128 |
| 5,160,263 | A | 11/1992 | Meller et al. | |
| 5,484,284 | A | * 1/1996 | Bailey | A61C 17/005 433/125 |
| 5,642,995 | A | 7/1997 | Bailey | |
| 5,683,247 | A | 11/1997 | Bailey | |
| 6,171,108 | B1 | * 1/2001 | Roane | A61C 1/141 433/102 |
| 8,118,594 | B2 | * 2/2012 | Pernot | A61C 1/141 433/114 |
| 2004/0063065 | A1 | 4/2004 | Schatz et al. | |
| 2007/0015108 | A1 | 1/2007 | Ruddle et al. | |

FOREIGN PATENT DOCUMENTS

| | | |
|---|---|---|
| JP | S61113440 | 5/1986 |
| JP | H09248310 | 9/1997 |
| JP | H11221233 | 8/1999 |
| JP | 2015535462 | 12/2015 |
| JP | 3203281 | 3/2016 |

* cited by examiner

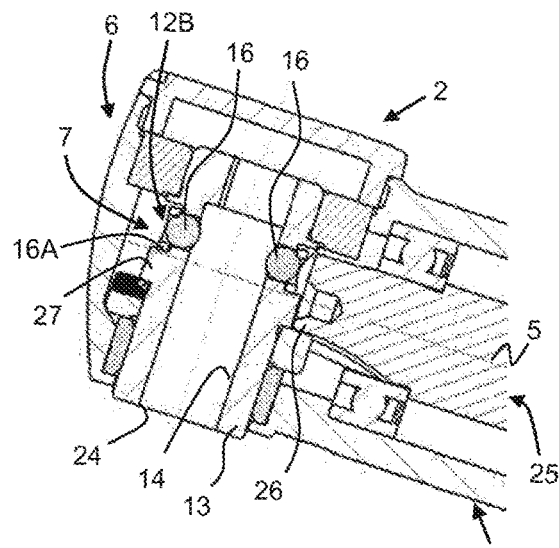
FIG. 3
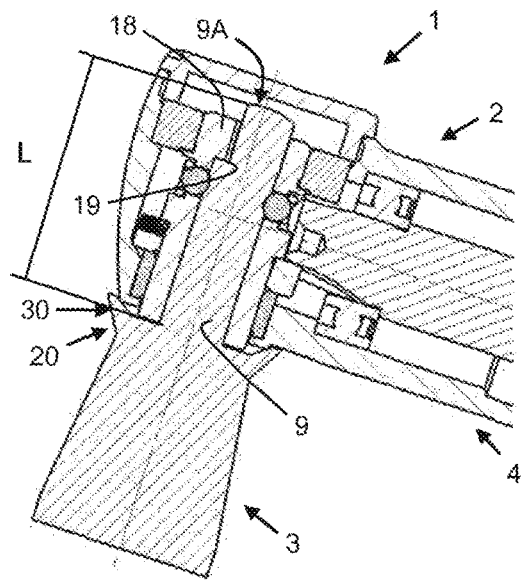
FIG. 3A
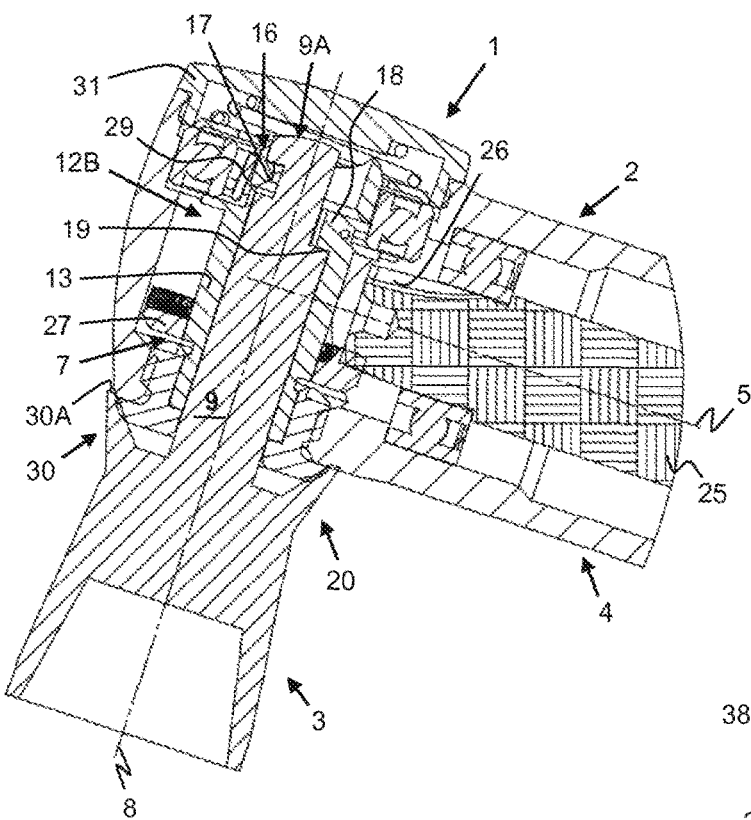
FIG. 4
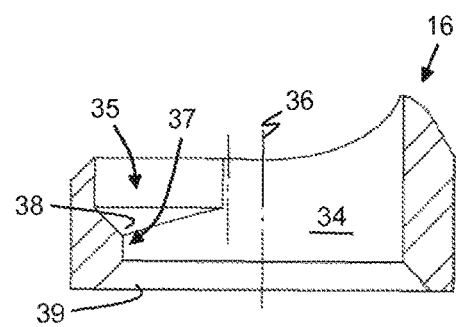
FIG. 5
FIG. 5A

DENTAL PROPHYLACTIC TREATMENT DEVICE

CROSS REFERENCE TO RELATED APPLICATION

This application is a U.S. bypass continuation application of International Application No. PCT/EP2018/069059, filed Jul. 13, 2018, which in turn claims priority from pending European Patent Application No. 17181328.0, filed Jul. 14, 2017, which are incorporated herein by reference.

FIELD

The present invention relates to a dental prophylactic treatment device comprising a prophylactic contra-angle handpiece with a handle part, a head part, and a tool holder disposed rotatably in the head part, as well as a dental tool with a tool shaft and a prophylactic treatment section connected to the tool shaft.

DESCRIPTION OF PRIOR ART

Such a prophylactic treatment device is known, for example, from patent application US 2004/063065 A1.

SUMMARY

It is an object to provide a prophylactic treatment device having the smallest possible external dimensions at the front end thereof facing the treatment site, in particular in the area of the head part of the prophylactic contra-angle handpiece, so that the user has as free and undisturbed a view of the treatment site as possible.

This object is achieved according to one embodiment by a dental prophylactic treatment device comprising: a prophylactic contra-angle handpiece having a handle part extending along a longitudinal axis, a head part adjoining the handle part, a tool holder disposed rotatably in the head part and extending along an axis of rotation and in particular rotating about said axis of rotation, the longitudinal axis of the handle part and the axis of rotation of the head part being disposed at an angle to one another, as well as a dental tool having a tool shaft and a prophylactic treatment section connected to the tool shaft, the tool shaft extending from an end of the dental tool facing the contra-angle handpiece over a length L to the prophylactic treatment section. At least a section of the tool shaft can be detachably mounted in the tool holder so that the dental tool can be rotated together with the tool holder about the axis of rotation. The tool shaft is made of plastic and the maximum length of the tool shaft is 10.0 mm. Alternatively, the tool shaft can be made of a different material, for example metal, in particular steel.

Preferably, the tool holder is rotatably supported in the head part of the prophylactic contra-angle handpiece by at least one slide bearing. Alternatively, the tool holder can be rotatably mounted in the head part of the prophylactic contra-angle handpiece by at least one roller bearing or ball bearing.

Preferably, the tool holder comprises a chucking device configured to fix the tool shaft of the dental tool frictionally (or other force-locking), or non-positively (i.e., without structural features in the chucking device and/or the tool shaft such as protrusions, recesses and the like that positively prevent relative rotation) in order to retain the tool shaft axially with respect to the axis of rotation of the tool holder and to effect rotary entrainment of the tool shaft and torque transmission to the tool shaft so that the dental tool can be rotated about the axis of rotation together with the tool holder. Surprisingly, it was found that such a non-positive or frictional chucking device is sufficient for a prophylactic treatment device or for prophylactic applications to bring about reliable fixing of the tool shaft in the chucking device, i.e., in particular during operation of the prophylactic treatment device no (substantial) relative displacement or rotation occurs between the tool shaft and the chucking device.

The chucking device, implemented for fixing the tool shaft of the dental tool non-positively or frictionally, preferably comprises a hollow shaft having a bore extending along the axis of rotation of the tool holder and in which at least a portion of the tool shaft can be detachably received. Preferably, at least a portion of the hollow shaft is configured to contact a portion of the tool shaft for bringing about frictional or non-positive fixation of the tool shaft in the hollow shaft. In particular, said contacting section of the hollow shaft or bore has an inside diameter no larger than the outside diameter of the tool shaft. Preferably at least one section of the inside of the hollow shaft or bore, in particular the contacting section, comprises a mechanically roughened surface.

The force-locking or friction-locking chucking device, in particular the contacting portion of the hollow shaft or bore, especially preferably comprises at least one clamping lug projecting into the bore in order to clamp the tool shaft in the hollow shaft in a force-locking or friction-locking manner. The at least one clamping lug has a curved shape, which is formed for example by mechanical forming. The at least one clamping lug is configured in particular to fix the dental tool exclusively by the spring action and holding force thereby generated and exerted. Preferably the at least one clamping lug is non-detachably connected to the hollow shaft or the shell thereof at at least two contact points.

Preferably, the wall thickness of the at least one clamping lug is less than the wall thickness of an area of the hollow shaft not having the clamping lug, so that during the manufacture of the at least one clamping lug the inward bending of the clamping lug is facilitated and the spring effect of the clamping lug is increased.

When the dental tool is inserted into the chucking device, the at least one clamping lug is displaced radially outwards (away from the axis of rotation) by the shaft. The holding force required for clamping the tool results from the restoring force of the displaced clamping lug. If the dental tool is removed from the chucking device, the spring action of the at least one clamping lug is sufficient for automatically returning of the clamping lug to its initial position.

Preferably the at least one clamping lug has an asymmetrical shape, in particular having an apex facing the axis of rotation. Particularly preferably, the apex of the at least one clamping lug is located in the upper half thereof, in particular at about 2/3 of the total length of the clamping lug relative to the opening of the chucking device through which the tool can be inserted into the chucking device.

Preferably, the prophylactic contra-angle handpiece or the tool holder does not comprise an actuating device, in particular no push button, for releasing the dental tool or the tool shaft from and/or receiving the same in the tool holder. In particular, the prophylactic contra-angle handpiece or tool holder does not have an actuating device for moving a holding element for holding or securing the dental tool axially in the tool holder (as part of the chucking device). The absence of such an actuating device is particularly feasible in the presence of a force-locking or friction-locking sliding chucking device as described above. However, the absence of such an actuating device can also be achieved by a positive sliding chucking device, as described in detail below. This means in particular that the tool holder is designed in such a way that the holding force generated and/or exerted by the tool holder for holding the dental tool, in particular axially, ensures the reliable fixing of the dental tool in the tool holder, but also allows simple loosening of the dental tool without an actuating device and without excessive effort for the user.

Accordingly, the holding force generated and/or exerted by the tool holder, particularly in the case of the prophylactic contra-angle handpiece not having an actuating device for releasing and/or receiving the dental tool, is preferably a maximum of 20 N, preferably in the range from 13 N to 17 N. It was found that the mentioned values for the holding force are sufficient, because the application of the dental prophylactic treatment device exerts no tensile load on the treatment site, but in particular only compressive loads. Said lower holding force in comparison to conventional dental handpieces is achieved, for example, by providing a smaller number of holding elements for the chucking device, for example by providing only one or two spherical holding elements or only one, two, or three clamping lugs, or by forming a holding element having a first inclined plane or chamfer described in detail below. The extraction force for releasing the dental tool from the tool holder corresponds particularly preferably to the holding force and/or has substantially the same values, i.e., maximum 20 N, preferably 13 N to 17 N.

If the prophylactic contra-angle handpiece or tool holder does not comprise an actuating device for releasing and/or receiving the dental tool in the tool holder, the tool shaft of the dental tool is preferably configured for being received by and/or detached from the tool holder without any actuating device. For example, the tool shaft can be made of plastic, rubber, or a similar elastic material. Alternatively or additionally, the tool shaft can have a rough or roughened surface. Alternatively or additionally, the tool shaft can be cylindrical over the entire length thereof as described in detail below. Alternatively or additionally, the tool shaft can have at least one recess or at least one groove extending in a ring or circle around the outer circumference of the tool shaft and designed in particular for engaging a holding element of the tool holder. As an alternative or in addition, the tool shaft has at least one recess, slot or indentation having a calotte shape disposed on the outer circumference of the tool shaft and designed in particular for engaging a holding element of the tool holder. Preferably, at least one spring element or latching element is provided on the tool shaft configured to axially secure the tool in the tool holder.

Preferably, the tool holder comprises a chucking device configured to positively fix the tool shaft of the dental tool in order to fix the tool shaft axially with respect to the axis of rotation of the tool holder, or for axially securing said shaft in the tool holder and/or for bringing about a rotary entrainment of the tool shaft and a torque transmission to the tool shaft. Preferably, the positive-locking chucking device comprises at least one or more positive connection units for interacting with the tool shaft. Preferably, the positive-locking chucking device comprises a snap-in connection.

Preferably, the positive-locking chucking device has a hollow shaft having a bore extending along the axis of rotation of the tool holder, in which bore at least a portion of the tool shaft can be detachably received.

The chucking device or the at least one positive-locking connecting unit preferably has at least one holding element radially displaceable with respect to the axis of rotation of the tool holder and configured to extend into or engage in a recess on the tool shaft, in particular in order to fix or secure the dental tool axially. Preferably, the at least one holding element is disposed on the hollow shaft and/or protrudes through a cross bore of the hollow shaft into the inside of the hollow shaft. Preferably, the at least one holding element is disposed at one end of the hollow shaft. The at least one holding element, for example, can be spherical, convex or wedge-shaped. The at least one holding element is preferably preloaded by a spring element, for example a spring washer or a spiral spring, in order to return to an initial position after a radial displacement.

Preferably, the at least one holding element can be displaced radially by the user via an actuating device (for receiving the dental tool or the tool shaft into and/or releasing the same from the tool holder). In particular, the actuating device is operatively connected to the at least one holding element in order to bring about the radial displacing of the holding element.

The actuating device comprises, for example, a pushbutton for actuating by the user, particularly on the outside of the prophylactic contra-angle handpiece or on the head part. The actuating device also comprises, for example, a sliding element or a sleeve being displaced by the pushbutton in order to establish the operative connection between the actuating device and the at least one holding element and/or for releasing the same and/or for moving the holding element radially.

The holding element of the positive-locking chucking device for the axial fixation of the tool especially preferably comprises a slide radially displaceable in relation to the axis of rotation of the tool holder and configured to engage in a recess or receptacle on the tool shaft. The slide (also sometimes referred to as a "slider") is in particular disposed at one end of the hollow shaft of the chucking device.

Preferably, the slide is ring-shaped or circular, having an internal pass-through opening. Preferably, the inner pass-through opening of the ring-shaped or circular slide is dimensioned in such a way that at least a portion of the tool, in particular of the tool shaft, can be received therein, particularly that portion of the tool shaft at which the recess or receptacle for engaging the holding element is provided. Preferably, the inner opening is defined or limited by a body or inner wall of the slide.

In particular, a protrusion or wedge is provided on the inner wall of the ring-shaped or arc-shaped slide and protrudes from the inner wall into the inner pass-through opening. In particular, a crescent-shaped shoulder or a crescent-shaped recess follows the wedge on the inner wall of the slider (in the axial direction with respect to the central axis of the holding element or with respect to the axis of rotation of the tool holder). In particular, the protrusion or wedge is intended for engaging in the recess or receptacle on the tool shaft for securing the tool axially in the chucking device.

The holding element, in particular the slider, is preferably pretensioned by a spring element, for example by a snap ring, in a holding or locking position, so that in particular the protrusion or wedge is displaced or approached in the direction of the axis of rotation of the tool holder in order to engage in the recess or receptacle of a tool shaft introduced into the chucking device. For releasing the tool from the chucking device and preferably also for introducing said tool into the chucking device, the holding element, in particular the slide, can be displaced against the spring force of the spring element and radially away from the axis of rotation of the tool holder into a releasing or unlocking position, so that in particular the protrusion or wedge does not engage in the interior of the hollow shaft and/or in the recess or receptacle of a tool shaft introduced into the chucking device, and the tool can be removed from the chucking device or introduced into the chucking device.

The displacing of the holding element, in particular the slide, into the unlocking position can be brought about according to one embodiment example by an actuating device on the prophylactic contra-angle handpiece, in particular on the head part thereof, as described above. The actuating device comprises in particular a pushbutton at one end of the head opposite the tool-receiving opening operatively connected to the holding element, in particular the slider, and displaces the latter against the force of the spring element and radially relative to the axis of rotation of the tool holder. The actuating device is preferably preloaded by a spring. In particular, the actuating device is axially displaceable (relative to the central axis of the holding element or relative to the axis of rotation of the tool holder) for moving the holding element to the releasing or unlocking position.

Alternatively, the displacing of the holding element, in particular the slide, into the releasing or unlocking position can be achieved only by inserting the tool into or withdrawing the tool from the chucking device. In such a prophylactic contra-angle handpiece there is in particular no actuating device necessary or present for moving the holding element or for releasing and/or receiving the dental tool or the tool shaft from/in the tool holder. Such a prophylactic contra-angle handpiece thus comprises a sliding chucking device without an actuating device, as described above.

In particular, in order to allow the tool to be released or withdrawn from the chucking device without an actuating device, the slider preferably has a wedge-shaped protrusion or wedge projecting into the internal pass-through opening, as already mentioned above. The wedge comprises a first inclined plane or chamfer on a side facing away from the tool-receiving opening, and particularly preferably a second inclined plane or chamfer on a side facing the tool-receiving opening. The first inclined plane and the second inclined plane preferably extend in the direction of the central axis of the holding element and/or the axis of rotation of the tool holder. The first inclined plane and the second inclined plane are preferably inclined relative to the central axis of the holding element or the axis of rotation of the tool holder and/or inclined relative to the inner wall of the slide, the inclination being not equal to 90°. The first inclined plane and the second inclined plane are preferably inclined towards one another in the direction of the central axis or axis of rotation, whereby the wedge-shaped protrusion tapers in the direction of the central axis or axis of rotation.

The first inclined plane or chamfer preferably connects the wedge-shaped protrusion with the shoulder or recess mentioned in the preceding paragraph. The first inclined plane or chamfer therefore preferably also defines a side surface or side wall of the shoulder or the recess. The first inclined plane and/or the shoulder or recess preferably extend in a crescent along a limited arc of a circle on the inner wall of the slide. The inclination of the first inclined plane with respect to the central axis of the holding element or the axis of rotation of the tool holder shall preferably be more than 90° and less than 180°. The inclination is particularly preferably about 100°-150°, in particular about 125°-145°.

The second inclined plane preferably forms one end of the holding element, in particular of the slide, in particular one end facing the tool-receiving opening. The second inclined plane preferably extends around the entire ring-shaped or arc-shaped slider and/or forms the end of the inner wall of the holding element.

In particular, the first inclined plane or chamfer favors or allows the release of the dental tool or the tool shaft from the tool holder without an actuating device. When the user pulls the tool (held in the tool holder) in the axial direction along the axis of rotation of the tool holder in order to release the tool from the chucking device, the tool, in particular a wall or edge of the recess or receptacle of the tool shaft in which the wedge of the holding element engages, due to its contact with the first inclined plane, displaces the slider radially from the holding or locking position into the release or unlocking position against the spring force of the spring element, so that the tool can be removed from the chucking device as described above. After the tool is moved out of the holding element or the chucking device, the spring element moves the holding element back into the holding or locking position.

A corresponding method for releasing a dental tool from a prophylactic contra-angle handpiece, which in particular form a dental prophylactic treatment device, comprises: displacing the tool axially along the axis of rotation of the tool holder from the tool holder, whereby by contact with the tool, in particular a wall or edge of the recess or receptacle of the tool shaft in which the wedge of the holding element engages, with the first inclined plane of the holding element, in particular of the slide, the holding element is displaced radially from the holding or locking position into the releasing or unlocking position against the spring force of the spring element, so that the tool can be removed from the chucking device. The method can therefore be carried out by the user without pressing a pushbutton on the prophylactic contra-angle handpiece. Further features of the method are described above.

In particular, the second inclined plane or chamfer facilitates or enables the inserting or securing of the dental tool or tool shaft in the tool holder, preferably without an actuating device. If the user moves or pushes the tool in the axial direction along the rotary axis into the tool holder in order to secure the tool in the chucking device, a free end of the tool shaft opposite the treatment section of the tool (i.e., the end of the tool facing the contra-angle handpiece) contacts the second inclined plane of the holding element or slider and (upon further pushing of the tool into the tool holder) thereby displaces the slider against the spring force of the spring member from the holding or locking position into the releasing or unlocking position so that the tool can be received in the pass-through opening of the slider. If the tool is moved further into the holding element, the spring element moves the holding element back into the holding or locking position so that the wedge-shaped extension of the slide engages in the recess or receptacle of the tool, whereby the tool is secured in the chucking device.

A corresponding method for inserting and securing a dental tool in a prophylactic contra-angle handpiece, which in particular form a dental prophylactic treatment device, comprises: moving the tool in the axial direction into the tool holder along the axis of rotation of the tool holder, wherein a free end of the tool shaft opposite the treatment section of the tool (i.e., the end of the tool facing the contra-angle handpiece) contacts the second inclined plane of the holding element or slide and (upon further pushing of the tool into the tool holder) thereby displaces the slide against the spring force of the spring element from the holding or locking position into the release or unlocking position, so that the tool can be received in the pass-through opening of the slide. If the tool is moved further into the holding element, the spring element moves the holding element back into the holding or locking position so that the wedge-shaped extension of the slide engages in the recess or receptacle of the tool, whereby the tool is secured in the chucking device.

The two methods mentioned above may also be combined to form a method for inserting and securing a dental tool into and removing it from a prophylactic contra-angle handpiece.

The slider described above with the wedge-shaped protrusion or wedge having a first inclined plane or chamfer on its side remote from the tool-receiving opening, or a prophylactic contra-angle handpiece with such a slider, also constitutes an independent inventive matter.

The chucking device, in particular a positive-locking chucking device, preferably comprises at least one first driving element configured to cooperate with a second driving element on the tool shaft in order to effect a rotary driving of the tool shaft and a torque transmission, so that the dental tool can be rotated about the axis of rotation together with the tool holder. Preferably the first or second driving element engages in the other driving element and/or the two driving elements contact one another.

The first driving element of the chucking device comprises, for example, an extension of the hollow shaft or it is connected to the hollow shaft in a rotationally-fixed manner. Preferably, the first driving element protrudes into the inside of the hollow shaft. The second driving element on the tool shaft comprises, for example, a receptacle or flattened part, in particular on a free (i.e., the contra-angle handpiece facing) end of the tool shaft. Alternatively or additionally, the first driving element and/or the second driving element is/are designed as polygons.

Preferably, the first driving element and the positive-locking connecting unit of the positive-locking chucking device are disposed next to each other axially (in relation to the axis of rotation). Preferably the first driving element and the positive-locking connecting unit are disposed at an end of the positive-locking chucking device, in particular at that end facing the actuating device, the pushbutton or the closing cover of the head part. The second driving element and the recess for the at least one holding element are preferably disposed at the free end or at the end of the dental tool facing the contra-angle handpiece in a corresponding manner.

Preferably the positive-locking, in particular latching, chucking device or the force-locking or friction-locking, in particular clamping, chucking device is designed as a sliding chucking device into which at least a portion of the tool shaft can be inserted. In particular, at least a portion of the tool shaft can be inserted into or removed from the bore of the hollow shaft by a sliding and/or straight-line displacing along the axis of rotation of the tool holder.

Preferably, the hollow shaft of the sliding chucking device is designed in such a way that during the insertion or removal of the tool, the inner wall of the hollow shaft guides at least a portion of the tool shaft in a contacting manner and/or at least a portion of the tool shaft slides along the inner wall of the hollow shaft.

A limiting element, for example a shoulder or a protrusion limiting the insertion depth of the tool shaft into the chucking device or hollow shaft, is preferably provided on the dental tool, in particular on the tool shaft. Alternatively or additionally, at least one stop element can be provided on the chucking device or hollow shaft, for example a shoulder or a step, formed in particular by a change in the inner diameter of the bore of the hollow shaft and limiting the insertion depth of the tool shaft into the chucking device or hollow shaft.

Preferably, the prophylactic treatment device comprises a sealing system for sealing the head part of the prophylactic contra-angle handpiece, preventing penetration of impurities and/or a treatment agent into the head part.

The sealing system is preferably provided on the dental tool, in particular being disposed on the dental tool such that it cooperates with the head part of the prophylactic contra-angle handpiece to prevent penetration of impurities and/or a treatment agent into the head part. In particular, the sealing system surrounds and/or contacts and/or covers and/or projects the underside of the head part facing the dental tool or a tool-receiving opening of the head part through which the dental tool can be inserted into the head part and removed out of it. Preferably, the sealing system comprises an apron provided in particular at one end of the treatment section of the dental tool and particularly preferably surrounding and/or contacting and/or covering and/or projecting the underside of the head part or the tool-receiving opening.

Alternatively or additionally, the upper edge of the sealing system, in particular the apron, surrounds and/or contacts and/or covers and/or projects the lower edge of the head part of the prophylactic contra-angle handpiece.

The sealing system is preferably designed as a sliding sealing system. In particular, the sealing system, preferably the apron, is designed to form a sliding contact with the underside of the head part facing the dental tool and/or the lower edge of the head part of the prophylactic contra-angle handpiece. In particular, the sliding contact is reversible, for example by removing the sealing system from the prophylactic contra-angle handpiece and/or the dental tool from the tool holder.

The surrounding and/or contacting and/or covering and/or projecting sealing system described above is particularly advantageous for prophylactic treatment devices whose prophylactic contra-angle handpieces have a positive-locking chucking device described above, in particular those having a first and second driving element, since the danger of foreign material penetrating into the prophylactic contra-angle handpiece through the chucking device is particularly high due to the greater number of components of the positive-locking chucking device and the gaps and intervening spaces between the components thereby formed.

Alternatively, the sealing system can be provided on the prophylactic contra-angle handpiece, in particular on the underside of the head part facing the dental tool or adjacent the tool-receiving opening.

Alternatively, the sealing system is constructed in several parts, whereby at least a first part of the sealing system is provided on the dental tool and at least a second part of the sealing system is provided on the prophylactic contra-angle handpiece, whereby the first part and the second part of the sealing system cooperate to prevent penetration of contaminants and/or a treatment agent into the head part. For example, the two parts of the sealing system interlock and/or contact one another and/or overlap one another. For example, the first part of the sealing system on the dental tool is constructed as described above for a sealing system on the dental tool. Particularly preferably, the first part of the sealing system on the dental tool comprises an apron provided in particular at an end of the treatment section of the dental tool and particularly preferably surrounds and/or contacts and/or covers and/or projects the underside of the head part or the tool-receiving opening.

Preferably, the second part of the sealing system on the prophylactic contra-angle handpiece comprises the underside of the head part of the prophylactic contra-angle handpiece, on which the tool-receiving opening is provided, and/or a casing section of the head part of the prophylactic contra-angle handpiece and/or the lower edge of the head part of the prophylactic contra-angle handpiece and a sealing element provided thereon. The sealing element, for example, is designed as a metallic or non-metallic sealing lip or as a metallic or non-metallic ring-shaped extension. The sealing element is formed in one piece with the underside and/or the casing section and/or the lower edge or alternatively fastened to it as a separate component.

According to one embodiment, the head part of the prophylactic contra-angle handpiece, in particular an outer shell of the head part, comprises a plurality of parts, whereby the sealing system surrounds and/or contacts and/or covers and/or projects at least part of the head part, in particular the outer shell, as described above. This part is formed, for example, by a receiving element, in particular a screw ring, accommodating and/or supporting the tool holding element, in particular the chucking device. Alternatively, the outer shell of the head part is formed in one piece and the sealing system surrounds and/or contacts and/or covers and/or projects at least a section of the one-piece outer shell.

Preferably, the sealing system, in particular the multi-part sealing system, is designed in such a way that the insertion or reception of the dental tool into the sliding chucking device causes or increases a sealing effect of the sealing system, for example by interlocking the first and second parts of the sealing system and/or by connecting and/or contacting and/or engaging over and/or projecting the sealing system with an element of the prophylactic contra-angle handpiece or the dental tool. The sealing system is preferably designed in such a way that by receiving the dental tool in the chucking device, in particular by positioning the tool in the operating position, a sliding contact of the sealing system with at least a portion of the head part of the prophylactic contra-angle handpiece or of parts of the multi-part sealing system is effected as described above.

The contact described above between the sealing system and the head part of the prophylactic contra-angle handpiece or between parts of the multi-part sealing system, so that in particular a sliding seal is formed, is advantageously favored or effected by the small length of the tool shaft of at most 10.0 mm.

The tool shaft of the dental tool is preferably designed as a cylindrical pin over its entire length, in particular without a recess for engagement of the tool holder. Preferably, the tool shaft has a smooth surface and/or a non-profiled surface over its entire length, in particular a surface without a recess for the engagement of an element of the tool holder, neither for axial securing nor for torque transmission or torsional entrainment. Such a dental tool can in particular be used with or inserted into a chucking device configured to fix the tool shaft of the dental tool non-positively or by friction.

Alternatively, at least one recess is provided on the tool shaft of the dental tool for engaging the tool holder, in particular the at least one positive-locking connecting unit, and/or at least one driving element, in the above also referred to as the second driving element. The recess, for example, is designed as a ring groove and/or recess and/or indentation. The (second) driving element is designed, for example, as a ring-shaped groove and/or recess and/or indentation or flattening, in particular at the end of the dental tool facing the contra-angle handpiece. Such a dental tool can in particular be used with or inserted into a chucking device configured to fix the tool shaft of the dental tool positively.

The individual features described above, and preferably the combination of several or all of these features, create a prophylactic treatment device having small external dimensions at the front end thereof facing the treatment site, particularly in the region of the head of the prophylactic contra-angle handpiece. In particular, the use of the described chucking devices and/or the use of slide bearings and/or the absence of an actuating device for releasing and/or receiving the dental tool from/in the tool holder cause a considerable reduction in the size of the head part. Preferably, the height of the head part from the tool-receiving opening to the side of the head part opposite the tool-receiving opening is at most 11.5 mm, preferably at most 10.0 mm, particularly preferably at most 9.5 mm. Preferably, the diameter of the head part is at most 8.5 mm, preferably at most 7.8 mm. Preferably, the length of the hollow shaft of the tool holder is at most 7.8 mm, preferably 7.5 mm, the outside diameter of the hollow shaft is at most 6.0 mm, preferably 5.5 mm, and the inside diameter of the hollow shaft is at most 2.36 mm, preferably 2.35 mm.

Due to one or more of the above features and the reduction in size of the head part, it is possible to limit the length L of the tool shaft to a maximum of 10.0 mm, preferably to a maximum of 8.0 mm. Fabricating the tool shaft from plastic in particular improves the sliding ability of the tool shaft during insertion into or removal from the slide chucking device.

The length L of the tool shaft, at most 10.0 mm, is understood in particular to be the free length of the tool shaft, i.e., that section of the tool shaft not directly contacted by another part of the tool, for example a body of a prophylactic cup. Preferably, however, at least part of the length L of the tool shaft is surrounded by (while being spaced apart from) the apron of the sealing system of the tool.

The embodiments described have many advantages. For example, the user's view of the treatment site is improved by reducing the size of the head area and/or the length of the tool shaft of the prophylactic treatment device or contra-angle handpiece. The operation of the prophylactic treatment device or the prophylactic contra-angle handpiece is made more comfortable for the user by holding the dental tool in the tool holder or releasing it without an actuating device. The elimination of the actuating device, especially of gaps or edges exposed to contamination in the pushbutton area, improves the hygienic situation in the area of the contra-angle handpiece head. The described sealing system prevents the penetration of dirt and treatment material at the underside of the head part. In particular, a prophylactic contra-angle handpiece not having an actuating device and having the described sealing system considerably improves the hygiene of the prophylactic contra-angle handpiece. The omission of the actuating device also reduces the height of the head region of the contra-angle handpiece.

These and other embodiments will be described below with reference to the following drawings.

BRIEF DESCRIPTION OF THE DRAWINGS

FIG. 3 shows a head part of a prophylactic contra-angle handpiece having a chucking device for fixing the tool shaft of the dental tool in a positive-locking manner;

FIG. 3A shows a prophylactic treatment device having the prophylactic contra-angle handpiece of FIG. 3;

FIG. 4 shows another embodiment of a prophylactic treatment device having a chucking device for fixing the tool shaft of the dental tool in a positive-locking manner;

FIG. 5 shows an embodiment of a holding element implemented in the prophylactic contra-angle handpiece of FIG. 4 and having a first inclined plane for axially securing the dental tool in the tool holder;

FIG. 5A shows a sectional representation of the holding element shown in FIG. 5.

DETAILED DESCRIPTION

Figure 1:
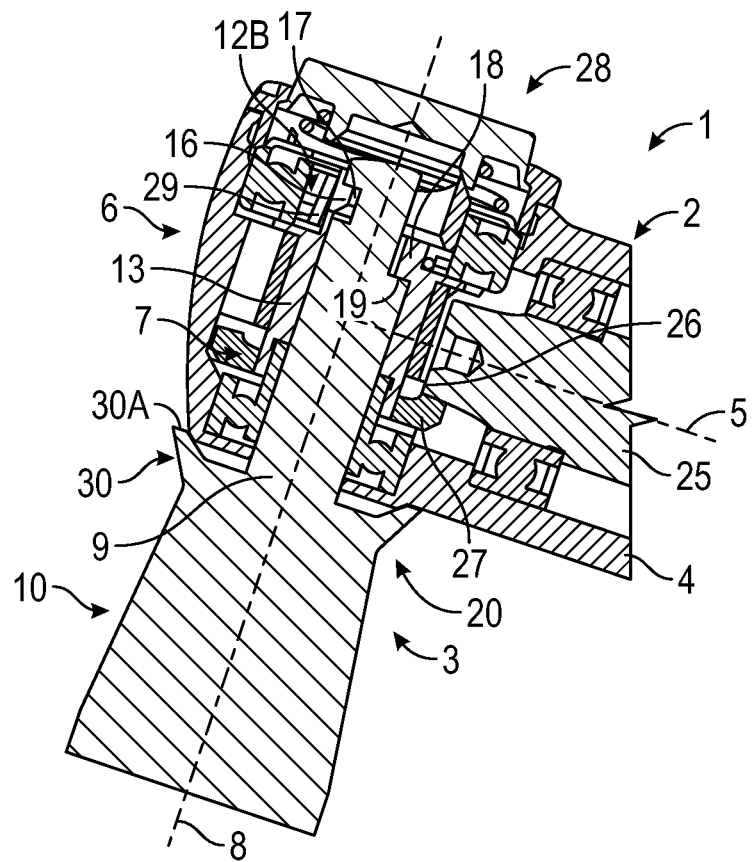
FIG. 1 shows a first example of a prophylactic treatment device having a chucking device for fixing the tool shaft of the dental tool in a positive-locking manner.

The prophylactic treatment device 1 shown in FIGS. 1, 2A, 3A and 4 comprises a prophylactic contra-angle handpiece 2 and a dental tool 3 detachably connectable to the prophylactic contra-angle handpiece 2.

The prophylactic contra-angle handpiece 2 shown in FIGS. 1-4 has a handle 4 extending along a longitudinal axis 5 for holding the prophylactic contra-angle handpiece 2 in one hand. A head part 6 is connected to the handle part 4, in which a tool holder 7 is rotatably disposed. The tool holder 7 extends along a rotary axis 8. The longitudinal axis 5 of the handle part 4 and the rotational axis 8 of the head part 6 are disposed at an angle to one another so that, in particular, a tool-receiving opening 24 is disposed laterally on the head part 6 or laterally offset to the handle part 4. Accordingly, the dental tool 3, especially the tool shaft 9 thereof, and/or the tool holder 7 extend along the axis of rotation 8 and/or at an angle to the longitudinal axis 5 of the handle part 4.

The handle part 4 and the head part 6 are preferably made of metal. The handle part 4 and the head part 6 are either single-piece and therefore inseparable from one another (see FIGS. 2, 2A) or the handle part 4 and the head part 6 are formed as separate, connectable elements.

A drive shaft 25 is rotatably mounted in handle part 4. At the end of the drive shaft 25 facing the head part 6, a first gear 26 is provided that meshes with a second gear 27 connected to the tool holder 7. A rotating drive motion can be transferred from the drive shaft 25 to the tool holder 7 and to a connected dental tool 3 via the gear system formed by the two gears 26, 27. The two gears 26, 27 are preferably made of metal.

The dental tool 3 comprises a tool shaft 9 and a prophylactic treatment section 10 connected to the tool shaft 9. The tool shaft 9 extends from a free end 9A of the dental tool 3 or from an end 9A facing the contra-angle handpiece over a (free) length L (see FIG. 3A) to the prophylactic treatment section 10. At least a section of the tool shaft 9 can be detachably mounted in the tool holder 7 so that the dental tool 3 together with the tool holder 7 can be rotated about the axis of rotation 8. The tool shaft 9 is made of plastic or another material, for example metal, in particular steel. The maximum length L of the tool shaft 9 is 10.0 mm.

The dental tool 3 is designed as a prophylactic tool and includes, for example, a prophylactic cup as prophylactic treatment section 10 for treating a dental surface with a paste, see FIGS. 1, 2A, 3A, and 4. However, the prophylactic treatment section 10 can also be formed differently, for example as a brush.

The tool holder 7 comprises a chucking device 12A or 12B, described in detail below. Both chucking devices 12A, 12B have in common that said devices are designed as sliding chucking devices. A sliding chucking device is a chucking device into which at least a section of the tool shaft 9 can be inserted or removed by a sliding and/or linear displacement along the axis of rotation 8 of the tool holder 7 (and/or at an angle greater than 0° to the longitudinal axis 5 of the section of the handle part 4 directly adjoining the head part 6). The chucking devices 12A, 12B comprise in particular a hollow shaft 13 having a bore 14 into which at least a portion of the tool shaft 9 can be inserted or removed in a corresponding manner. The gear wheel 27 is attached to the hollow shaft 13. The hollow shaft 13 is preferably made of metal.

Figure 2A:
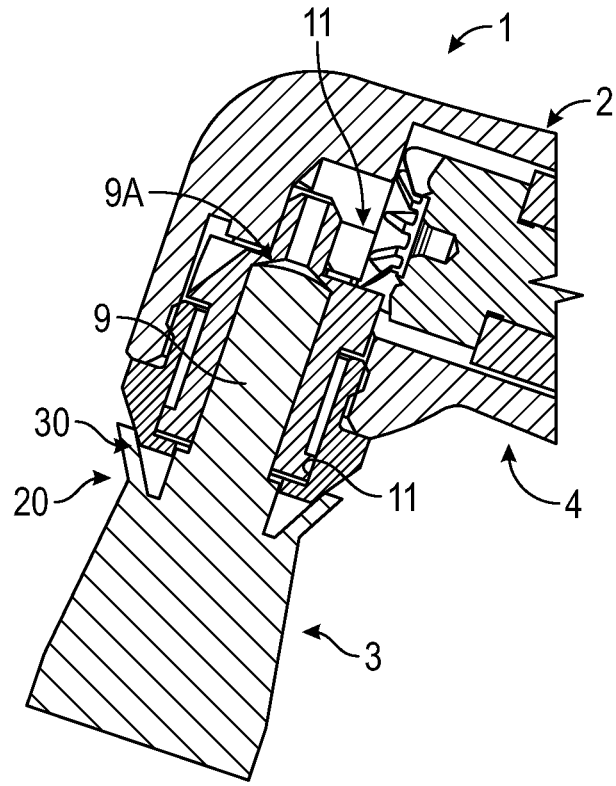
FIG. 2A shows a prophylactic treatment device having the prophylactic contra-angle handpiece of FIG. 2.
Figure 2:
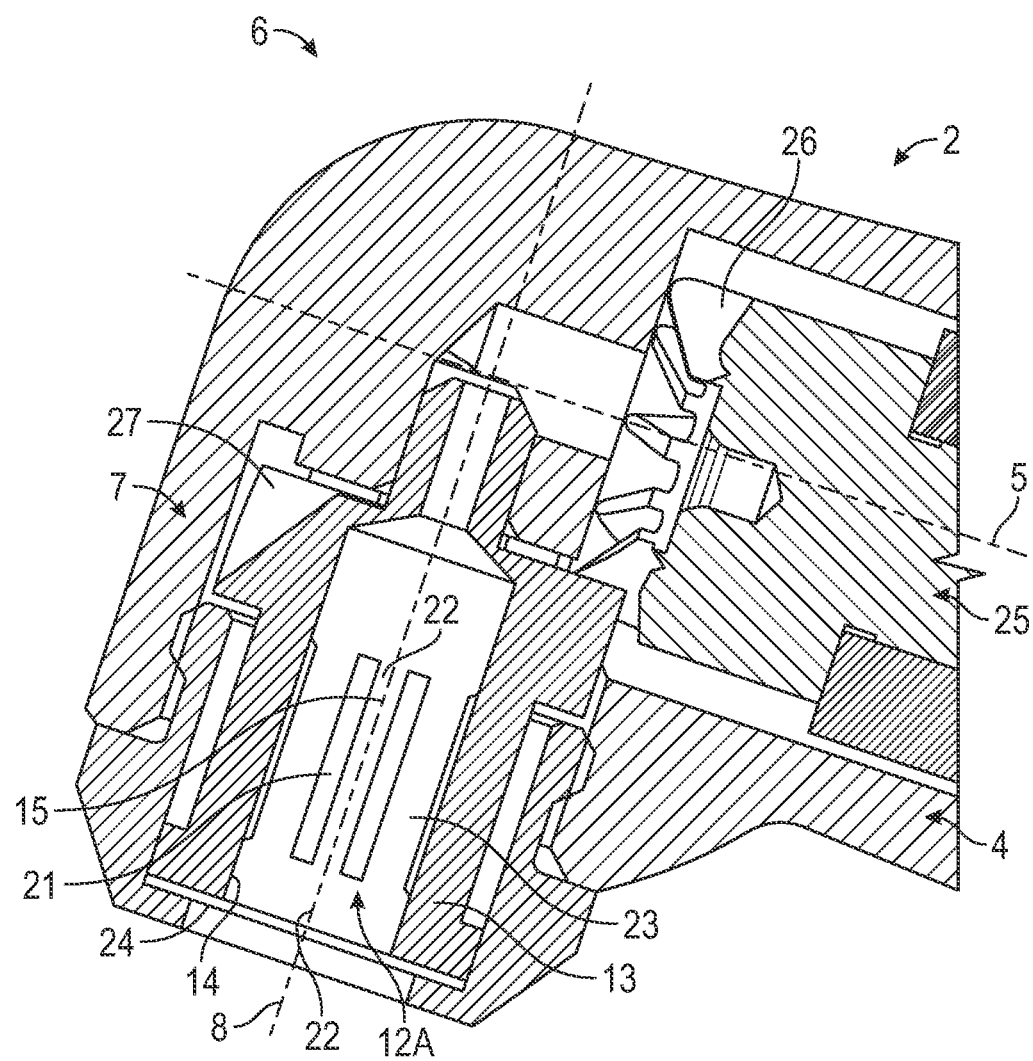
FIG. 2 shows a head part of a prophylactic contra-angle handpiece with a chucking device for fixing the tool shaft of the dental tool frictionally or in a force-locking manner.

The tool holder 7 shown in FIGS. 2, 2A has a chucking device 12A configured to fix the tool shaft 9 of the dental tool 3 non-positively or by friction in order to hold the tool shaft 9 axially with respect to the axis of rotation 8 of the tool holder 7 and to cause the tool shaft 9 to rotate.

The tool holder 7 is mounted rotatably in the head part 6 of the prophylactic contra-angle handpiece 2 by two slide bearings 11.

The force-locking or friction-locking chucking device 12A has a hollow shaft 13 with a bore 14 extending along the axis of rotation 8 of the tool holder 7, in which bore 14 at least a portion of the tool shaft 9 can be detachably received as described above, in particular by a sliding movement along the axis of rotation 8. The force-locking or friction-locking chucking device 12A further comprises at least one clamping lug 15 projecting into the interior of the bore 14 for clamping the tool shaft 9 in the hollow shaft 13.

The force-locking or friction-locking chucking device 12A shown in FIGS. 2, 2A has several clamping lugs 15 spaced apart from one another, in particular evenly. All clamping lugs 15, for example three, are machined by inserting two slots 21 into each shell of the hollow shaft 13.

Each clamping lug 15 is connected at two contact points 22 to the hollow shaft 13, in particular the shell thereof, in a non-detachable manner. The clamping lugs 15 are bent radially inwards (into bore 14), so that in particular the clear width between an inwardly bent clamping lug 15 and the inner wall of bore 14 is smaller than the diameter of the tool shaft 9.

There are bars 23 between the clamping lugs 15 or between the respective slots 21 for stabilizing the chucking device 12A, in particular the hollow shaft 13.

The prophylactic contra-angle handpiece 2 or the chucking device 12A of FIGS. 2, 2A, 4 has no actuating device for releasing the dental tool 3. To remove the dental tool 3 from the chucking device 12A, the user simply pulls on the dental tool 3 so that the dental tool 3 slides along the axis of rotation 8 out of the chucking device 12A. Accordingly, no mechanism is provided for clamping the dental tool 3; a user also simply moves or pushes the tool shaft 9 along the rotary axis 8 into the chucking device 12A for this purpose.

The tool holder 7 shown in FIGS. 1, 3, 3A, and 4 comprises a chucking device 12B configured to fix the tool shaft 9 of the dental tool 3 positively. The chucking device 12B in turn comprises a hollow shaft 13 with a bore 14 into which at least a portion of the tool shaft 9 can be inserted or removed by sliding.

The positive-locking chucking device 12B further comprises at least one holding element 16 radially displaceable with respect to the axis of rotation 8 of the tool holder 7 and is adapted to engage in a recess 17 on the tool shaft 9. The holding element 16 is intended in particular for the axial securing of tool 3 or tool shaft 9 in the positive-locking chucking device 12B.

The prophylactic contra-angle handpiece 2 of FIGS. 1 and 4 comprises a single radially displaceable holding element 16 having a wedge or (wedge-shaped) extension displaceable between a holding position in which said wedge approaches the axis of rotation 8 radially and engages the recess 17, for axially fixing the dental tool 3 in the tool holder 7, and a release position in which said wedge is radially remote from the axis of rotation 8 and does not engage the recess 17 so that the dental tool 3 can be released from the tool holder 7.

The prophylactic contra-angle handpiece 2 of FIGS. 3, 3A comprises several radially displaceable holding elements 16, for example two or three. The holding elements 16 are ball-shaped. The plurality of holding elements 16 can also be displaced between a holding position and a release position as described in the previous paragraph. A spring element 16A, for example a spring washer having apertures in which the holding elements 16 are received, or a spiral spring, pushes the holding elements 16 into the bore 14 and/or moves the holding elements 16 in the direction of the axis of rotation 8, if these have been moved away from the axis of rotation 8, for example when inserting or releasing the tool shaft 9. The holding elements 16 preferably snap into the receptacles on the tool shaft 9.

An actuating device 28 operatively connected to the at least one holding element 16 in order to move the holding element 16 between the holding position and the release position is provided for moving the at least one holding element 16 of FIG. 1. The actuating device 28 is therefore also designed in particular to enable the release of the dental tool 3 or the tool shaft 9 from the tool holder 7 and/or to receive it therein. The actuating device 28 comprises, in particular, a pushbutton at an end of the head part 6 opposite to the tool-receiving opening 24. For example, an extension is provided on the actuating device 28 operatively connected to the holding element 16 and when the actuating device 28 is actuated, i.e., moved along the axis of rotation 8 in the direction of the tool-receiving opening 24, the holding element 16 moves radially (according to FIG. 1 to the left) to the release position against the spring force of a spring element 29. As a result, the wedge-shaped extension of the holding element 16 no longer engages in the recess 17 of the dental tool 3 and said tool can be removed from the tool holder 7.

Such an actuating device 28 is also imaginable for the prophylactic contra-angle handpiece 2 of FIGS. 3, 3A in order to move the holding elements 16, designed as balls, between a holding position and the release position. In particular, the actuating device 28 is operatively connected to a locking sleeve. The locking sleeve can be moved axially along the rotation axis 8 in order to force the holding elements 16 into the holding position or to release the holding elements 16 for the release position.

However, the prophylactic contra-angle handpiece 2 shown in FIGS. 3, 3A has no actuating device for releasing the dental tool 3, in particular no actuating device for moving the ball-shaped holding elements 16 and/or no pushbutton. To remove dental tool 3 from chucking device 12B, the user simply pulls on dental tool 3 so that dental tool 3 slides out of chucking device 12B along rotational axis 8. Accordingly, no mechanism is provided for chucking the dental tool 3 in the chucking device 12B; for this purpose a user also moves or pushes the tool shaft 9 along the axis of rotation 8 into the chucking device 12B. If the holding elements 16 are moved out of the holding position during the insertion or release of the dental tool 3, for example by the shaft 9 of the dental tool 3, the spring element 16A forces the holding elements 16 back into the holding position.

The positive-locking chucking device 12B of FIGS. 1, 3, 3A, and 4 further comprises at least one first driving element 18 adapted to cooperate with a second driving element 19 on the tool shaft 9 to effect rotary driving of the tool shaft 9 and torque transmission to the tool shaft 9. The first driver element 18 comprises an extension engaging the second driver element 19 in the form of a flattening at a free end or at an end of the tool shaft 9 facing the counter-angle handpiece. The first driving element 18 can be rotated (by the drive shaft 25) together with the positive-locking chucking device 12B or hollow shaft 13 and takes the tool shaft 9 with it due to the engagement thereof in the second driving element 19, so that the dental tool 3 can be rotated and a torque can be transmitted to the dental tool 3.

FIGS. 1, 2A, 3A, and 4 also show a sealing system 20 for sealing the head part 6 of the prophylactic contra-angle handpiece 2 to prevent penetration of impurities and/or a treatment agent into the head part 6. The sealing system 20 is provided at least partially or completely on the dental tool 3. The sealing system 20 is disposed on the dental tool 3 in such a way that it interacts with the head part 6 of the prophylactic contra-angle handpiece 2, in particular surrounding the tool-receiving opening 24 and/or surrounding or contacting the underside of the head part 6, on which the tool-receiving opening 24 is provided.

The sealing system 20 comprises an apron 30 provided at one end of the treatment section 10 of the dental tool 3 and surrounding and/or touching and/or covering and/or projecting the underside of the head part 6 or the tool-receiving opening 24. In particular, the upper edge 30A (see FIGS. 1, 4) of the sealing system 20 surrounds and/or contacts and/or covers and/or projects the lower edge of the head part 6 of the prophylactic contra-angle handpiece 2.

The sealing system 20 is configured such that the insertion of the dental tool 3 into the sliding chucking device 12A, 12B causes or increases a sealing effect of the sealing system 20, for example by the contact between the sealing system 20 and the underside of the head part 6 resulting from the insertion of the dental tool 3.

The holding element 16 of the dental prophylactic treatment device 1 of FIG. 4 differs from that of FIG. 1, so that the prophylactic contra-angle handpiece 2 of FIG. 4 does not require or have an actuating device for moving the holding element 16 or for releasing and/or receiving the dental tool 3 or the tool shaft 9 in the tool holder 7. Element 31 of the prophylactic contra-angle handpiece 2 of FIG. 4 is therefore not a displaceable pushbutton for moving the holding element 16 into the release position, as described in connection with FIG. 1, but a cover connected, in particular screwed, to the head part 6 or the outer shell of the prophylactic contra-angle handpiece 2.

An embodiment of the holding element 16 of the dental prophylactic contra-angle handpiece 2 of FIG. 4 is shown in FIGS. 5 and 5A. The holding element 16 is configured as a slide radially displaceable in relation to the axis of rotation 8 of the tool holder 7.

The slide 16 is of ring-shaped or circular shape with an inner pass-through opening 32 into which at least a portion of the tool 3 can be inserted, in particular that portion of the tool shaft 9 at which the recess or receptacle 17 for engaging the holding element 16 is provided. The slider 16 also has a ring-shaped or circular body 33 with an inner wall 34 and an outer wall.

A protrusion or wedge 37 (see especially FIG. 5A) is provided on the inner wall 34 and projects from the inner wall 34 into the inner pass-through opening 32. A sickle-shaped or crescent-shaped shoulder or a sickle-shaped or crescent-shaped recess 35 adjoins it. The wedge 37 is intended to engage in the recess or receptacle 17 on the tool shaft 9 in order to secure the tool 3 axially in the slide chucking device 12B. The wedge 37, together with the shoulder/recess 35 in particular, thus forms the axial securing element for the tool 3.

The wedge 37 comprises a first inclined plane or chamfer 38 on an upper side (facing away from the tool-receiving opening 24) and a second inclined plane or chamfer 39 on a lower side (facing the tool-receiving opening 24). The first inclined plane 38 and the second inclined plane 39 are inclined to each other in the direction of the central axis 36, whereby the wedge 37 is formed and tapers in the direction of the central axis 36. The first inclined plane or chamfer 38 also connects the wedge 37 with the shoulder/recess 35. The first inclined plane 38 thus defines in particular a side surface or side wall of shoulder/recess 35.

The second inclined plane 39 forms one end of slide 16. The second inclined plane 39 extends around the entire ring-shaped or circular body 33 of the slide 16 and/or forms the end of the inner wall 34. The wedge 37 in some implementations can be formed only of non-orthogonal outer faces. In some implementations, in a cross-sectional view the non-orthogonal outer faces can have the shape of a pyramidal frustum. In some implementations, the pyramidal frustum has a top non-orthogonal outer face projecting closest to the axis of rotation and extending in parallel with the axis of rotation.

The slide 16 is pretensioned in a holding or locking position by a spring element 29, for example by a snap ring (see FIG. 4), so that the slide 16 is moved with the wedge 37 in the direction of the axis of rotation 8 of the tool holder 7 in order to engage in the recess 17 of the tool shaft 9 inserted into the chucking device 12B. To release the tool 3 from the chucking device 12B and also to insert it into the chucking device 12B, the slide 16 can be moved against the spring force of the spring element 29 and radially away from the axis of rotation 8 into a release or unlocking position so that the wedge 37 does not engage in the interior of the hollow shaft 13 and/or in the recess 17 of the tool shaft 9 and the tool 3 can thus be removed from the slide chucking device 12B or inserted into the slide chucking device 12B.

The movement of the holding element 16 to the release or unlocking position is carried out exclusively by inserting tool 3 into or withdrawing tool 3 from the chucking device 12B. When the tool 3 is released from the slide chucking device 12B, this is effectuated by the first inclined plane or chamfer 38, since when the tool 3 is removed from the chucking device 12B, a wall or edge of the receptacle 17 of the tool shaft 9, into which the wedge 37 of the holding element 16 engages, contacts the first inclined plane 38 and thus displaces the slide 16 radially into the release or unlocking position against the spring force of the spring element 29.

In contrast, the holding element 16 of the prophylactic contra-angle handpiece 2 of FIG. 1 does not have a first inclined plane. This holding element 16 has a locking protrusion on the upper side of which (facing away from the tool-receiving opening 24) a surface is provided disposed at right angles to the axis of rotation 8 or to the central axis of the holding element 16 or to the inner wall of the holding element 16. Due to the right-angled arrangement of this surface, it is not possible to release tool 3 by pulling it out (as described above for chucking device 12B of FIG. 4 and holding element 16 of FIGS. 5, 5A) from sliding chucking device 12B and therefore the actuating device 28 is necessary to move holding element 16 into the release or unlocking position.

The embodiments described or shown serve for depicting the invention. The features disclosed in one embodiment are therefore not limited to that embodiment, but can rather be combined individually or together with one or more features of one of the other embodiments.

What is claimed is:

1. A dental prophylactic treatment device comprising:
a prophylactic contra-angle handpiece having
a handle part extending along a longitudinal axis,
a head part adjoining the handle part,
a tool holder rotatably disposed in the head part and extending along an axis of rotation, wherein the longitudinal axis of the handle part and the rotational axis of the head part are disposed at an angle to one another,
a dental tool having
a tool shaft, and
a prophylactic treatment section connected to the tool shaft,
wherein said tool shaft extends from a handpiece end of the dental tool over a length up to the prophylactic treatment section, wherein
at least a section of said tool shaft is detachably receivable in the tool holder, so that the dental tool together with the tool holder can be rotated about the axis of rotation, wherein
the tool holder comprises a positive-locking chucking device configured to retain the tool shaft of the dental tool in a positive-locking manner, wherein
the positive-locking chucking device is radially displaceable with respect to the axis of rotation of the tool holder and comprises a ring-shaped slider having an inner wall and an inner pass-through opening defined by said inner wall, wherein a wedge-shaped protrusion extends from said inner wall into said inner pass-through opening, wherein
the wedge-shaped protrusion comprises a first inclined plane on the upper side thereof facing away from a tool-receiving opening of the prophylactic contra-angle handpiece and a second inclined plane on its underside facing the tool-receiving opening of the prophylactic contra-angle handpiece, wherein the first inclined plane and the second inclined plane extend toward one another in the direction of the axis of rotation to form a taper having a plurality of outer faces which engage a recess on the tool shaft to axially retain the dental tool in the positive-locking chucking device when the tool shaft is arranged in the inner pass-through opening of the ring-shaped slider, wherein
the wedge-shaped protrusion is formed only by non-orthogonal outer faces arranged non-orthogonally relative to the axis of rotation,
a spring element which moves the ring-shaped slider with the wedge-shaped protrusion radially with respect to the axis of rotation of the tool holder; and wherein the prophylactic contra-angle handpiece has no user-operated pushing device for moving the ring-shaped slider for releasing the dental tool from the tool holder.

2. The dental prophylactic treatment device according to claim 1, wherein
the ring-shaped slider is a ring having a continuous inner wall surface surrounding the inner pass-through opening.

3. The dental prophylactic treatment device according to claim 1, wherein
the first inclined plane is defined in a crescent-shaped recess in the inner wall.

4. The dental prophylactic treatment device according to claim 1, wherein
the positive-locking chucking device comprises at least one first driving element configured to interact with a second driving element on the tool shaft in order to bring about a rotary driving of the tool shaft, so that the dental tool can be rotated about the axis of rotation together with the tool holder.

5. The dental prophylactic treatment device according to claim 1, further comprising
a sealing system for sealing the head part of the prophylactic contra-angle handpiece which prevents penetration of impurities and/or a treatment agent into the head part.

6. The dental prophylactic treatment device according to claim 5, wherein
the sealing system is disposed on the dental tool such that said system interacts with the head part of the prophylactic contra-angle handpiece in order to prevent penetration of impurities and/or a treatment agent into the head part.

7. The dental prophylactic treatment device according to claim 5, wherein
the sealing system is provided on the prophylactic contra-angle handpiece.

8. The dental prophylactic treatment device according to claim 7, wherein
the tool holder comprises a hollow shaft having a bore and is configured as a sliding tool holder into which at least a portion of the tool shaft can be inserted into or removed from the bore of the hollow shaft by a sliding movement along the axis of rotation of the tool holder, wherein the sealing system is configured in such a way that the insertion of the dental tool into the hollow shaft causes or increases a sealing effect of the sealing system.

9. The dental prophylactic treatment device according to claim 1, wherein
in a cross-sectional view the non-orthogonal outer faces have the shape of a pyramidal frustum.

10. The dental prophylactic treatment device according to claim 9, wherein
the pyramidal frustum has a top non-orthogonal outer face projecting closest to the axis of rotation and extending in parallel with the axis of rotation.

11. The dental prophylactic treatment device according to claim 1, wherein the tool shaft comprises at least one of plastic or metal and wherein the length of the tool shaft is a maximum of 10.0 mm.

12. A dental prophylactic treatment device comprising a dental prophylactic contra-angle handpiece for rotatably driving a dental tool which can be connected to the prophylactic contra-angle handpiece and which has a prophylactic treatment section, wherein the prophylactic contra-angle handpiece comprises:
a handle part extending along a longitudinal axis,
a head part adjoining the handle part, and
a tool holder rotatably disposed in the head part and extending along an axis of rotation, the longitudinal axis of the handle part and the axis of rotation of the head part being disposed at an angle to one another, wherein
the tool holder comprises a positive-locking chucking device configured to fix the tool shaft of the dental tool in a positive-locking manner, wherein the positive-locking chucking device comprises a holding element radially displaceable with respect to the axis of rotation of the tool holder, wherein
the holding element comprises a ring-shaped spring biased slide having an inner wall and an inner pass-through opening defined by the inner wall, wherein a wedge-shaped protrusion extends from the inner wall into the inner pass-through opening, wherein
the wedge-shaped protrusion is configured to engage in a recess on a tool shaft of the dental tool in order to secure the dental tool axially in the chucking device, and wherein
the wedge-shaped protrusion comprises a first inclined plane on the upper side thereof facing away from a tool-receiving opening of the prophylactic contra-angle handpiece and a second inclined plane on its underside facing the tool-receiving opening of the prophylactic contra-angle handpiece, wherein
the wedge-shaped protrusion is bounded by outer surfaces contained within a space defined by a projected intersection of the first inclined plane with the second inclined plane, wherein
each outer surface of the wedge-shaped protrusion which engages the recess on the tool shaft and contacts a surface of the recess when the tool shaft is arranged in the inner pass-through opening of the ring-shaped slide is a non-orthogonal outer face arranged non-orthogonally relative to the axis of rotation and wherein the prophylactic contra-angle handpiece has no pushing device for moving the holding element for releasing the dental tool from the tool holder.

13. The dental prophylactic treatment device according to claim 12, wherein
the first inclined plane and the second inclined plane extend toward the axis of rotation to form a taper having only non-orthogonal outer faces relative to the axis of rotation.

14. A dental prophylactic treatment device comprising:
a prophylactic contra-angle handpiece having
a handle part extending along a longitudinal axis,
a head part adjoining the handle part,
a tool holder rotatably disposed in the head part and extending along an axis of rotation, wherein the longitudinal axis of the handle part and the axis of rotation of the head part are disposed at an angle to one another, and the tool holder being configured to releasably hold a dental tool having a tool shaft and a prophylactic treatment section connected to the tool shaft so that the dental tool together with the tool holder can rotate about the axis of rotation, wherein
the tool holder comprises a positive-locking chucking device configured to fix the tool shaft of the dental tool in a positive-locking manner, wherein
the positive-locking chucking device comprises at least one holding element radially displaceable with respect to the axis of rotation of the tool holder and configured to engage a recess of the tool shaft of the dental tool to axially retain the dental tool in the tool holder, and wherein the holding element comprises a ring-shaped, spring biased slide having an inner wall and an inner pass-through opening defined by the inner wall, wherein a wedge-shaped protrusion extends from the inner wall into the inner pass-through opening, wherein the wedge-shaped protrusion is configured to engage in the recess on the tool shaft of the dental tool in order to secure the dental tool axially in the chucking device, and wherein the wedge-shaped protrusion comprises a first inclined plane on the upper side thereof facing away from a tool-receiving opening of the prophylactic contra-angle handpiece and a second inclined plane on its underside facing the tool-receiving opening of the prophylactic contra-angle handpiece, wherein wherein the first and second inclined planes are arranged non-orthogonally relative to the axis of rotation, and wherein the prophylactic contra-angle handpiece has no manually operated pushing device on the outside of the prophylactic contra-angle handpiece for moving the holding element for releasing the dental tool from the tool holder.

15. The dental prophylactic treatment device according to claim 14, wherein the at least one holding element is configured such that it radially moves into a release position when a user pulls the dental tool retained in the tool holder along the axis of rotation of the tool holder, so that the tool can be removed from the positive-locking chucking device.

16. The dental prophylactic treatment device according to claim 14, further comprising a sealing system for sealing the head part of the prophylactic contra-angle handpiece which prevents penetration of impurities and/or a treatment agent into the head part, wherein the sealing system is configured such that the introduction of the dental tool into the positive-locking chucking device effects or increases a sealing effect of the sealing system by contacting an underside of the head part facing the dental tool or a lower edge of the head part which connects the underside and a lateral surface of the head part.

\* \* \* \* \*